(12) United States Patent  (10) Patent No.: US 8,917,714 B2
Degenaro et al.  (45) Date of Patent: Dec. 23, 2014

(54) COOPERATIVE ROUTING BETWEEN TRAFFIC CONTROL DEVICE AND MULTI-SERVER APPLICATION

(75) Inventors: Louis R. Degenaro, White Plains, NY (US); Adolfo F. Rodriguez, Raleigh, NC (US)

(73) Assignee: International Business Machines Corporation, Armonk, NY (US)

(*) Notice: Subject to any disclaimer, the term of this patent is extended or adjusted under 35 U.S.C. 154(b) by 1002 days.

(21) Appl. No.: 12/146,758

(22) Filed: Jun. 26, 2008

(65) Prior Publication Data

US 2008/0263223 A1  Oct. 23, 2008

Related U.S. Application Data

(63) Continuation of application No. 11/224,891, filed on Sep. 13, 2005, now abandoned.

(51) Int. Cl.
*H04L 12/28* (2006.01)
*G06F 15/16* (2006.01)
*H04L 29/08* (2006.01)

(52) U.S. Cl.
CPC .................................. *H04L 67/327* (2013.01)
USPC ........... 370/351; 370/390; 370/401; 709/219; 709/232; 709/238

(58) Field of Classification Search
USPC .......... 370/351, 390, 401; 709/219, 226, 232; 713/153
See application file for complete search history.

(56) References Cited

U.S. PATENT DOCUMENTS

| | | | |
|---|---|---|---|
| 2004/0258066 A1* | 12/2004 | Chen et al. | 370/390 |
| 2005/0010653 A1* | 1/2005 | McCanne | 709/219 |
| 2005/0015340 A1* | 1/2005 | Maes | 705/44 |
| 2005/0083834 A1* | 4/2005 | Dunagan et al. | 370/221 |
| 2005/0198351 A1* | 9/2005 | Nog et al. | 709/232 |
| 2005/0220126 A1* | 10/2005 | Gervais et al. | 370/401 |
| 2006/0143439 A1* | 6/2006 | Arumugam et al. | 713/153 |
| 2006/0165053 A1* | 7/2006 | Bhatnagar et al. | 370/351 |
| 2006/0235973 A1* | 10/2006 | McBride et al. | 709/226 |

* cited by examiner

*Primary Examiner* — Awet Haile
(74) *Attorney, Agent, or Firm* — Scully, Scott, Murphy & Presser, P.C.; Preston Young, Esq.

(57) ABSTRACT

A method, apparatus and programmed storage device for routing data through a communications network. More specifically, a programmable traffic manager is programmed with at least one application level directive and the data is routed through the network to one of the network nodes using the programmable traffic manager, which is programmed in accordance with the application level directive. In a particular example of this invention, a request from a client is routed by the programmable traffic manager to at least one a plurality of servers hosting an application, where the programmable traffic manager is routed in accordance with the application level directive.

12 Claims, 3 Drawing Sheets

Application and Traffic Manager Cooperative Routing

COOPERATIVE ROUTING BETWEEN TRAFFIC CONTROL DEVICE AND MULTI-SERVER APPLICATION

RELATED APPLICATIONS

This application is a continuation of U.S. Ser. No. 11/224,891, filed on Sep. 13, 2005, the entire contents of which are incorporated herein by reference.

BACKGROUND OF THE INVENTION

The present invention generally relates to networks, distributed application systems, and application-oriented networking. More specifically, the present invention relates to methods and apparatus for routing requests through networks to distributed applications.

DESCRIPTION OF RELATED ART

The International Standards Organization (ISO) Open Systems Interconnect (OSI) model for computer communications comprises seven layers: (1) Physical, (2) Data Link, (3) Network, (4) Transport, (5) Session, (6) Presentation, and (7) Application. The objective of this model is to provide for computer networks whereby end-systems (clients, hosts, nodes, servers, etc.) can be connected in order to interchange information. The ubiquitous network generally available to all has come to be known as the Internet, while more restrictive networks are known as intranets. These types of networks typically use packet-switching techniques to transfer information between end-points, in contrast to circuit-switching techniques that have been typically used for public telephone networks.

In lieu of establishing a dedicated communication line between two communicators, packet-switching encourages shared communication links. In packet-switching, information to be transmitted is divided into pieces and each piece is transmitted independently though the network ordinarily comprised of a labyrinth of connections. Each piece is known as a packet, which is the smallest unit of information that can be transmitted though the network. All the packets needed to transfer one unified information entity do not necessarily have to take the same path from source to destination, as is the case in a circuit switched network.

Thus, when employing packet switching, information is disassembled at or near the source into data packets; each data packet flows though the network independently; and at or near the destination, the data packets are re-assembled to produce the original information dispatched at the source.

Popular implementations of the OSI Network and Transport layers respectively are the Transmission Control Protocol (TCP) and Internet Protocol (IP), together referred to as TCP/IP. TCP controls the flow of information on an end-to-end basis, for example between two end-systems. IP controls the flow of information on a hop-by-hop basis, for example between two intermediaries in the sequence of nodes (or systems) visited by a packet as it traverses the network from the originating node to the final destination node. The IP layer provides connectionless, unreliable delivery of packets. The TCP layer employs the IP layer to provide reliable, virtual circuits.

At the Network layer, routers are often employed for making decisions as to the path to take for movement of packets between networks. Routers make routing decisions according to four basic algorithm types: static routing; isolated dynamic routing; centralized dynamic routing; and distributed dynamic routing. In all cases, the algorithms seek to optimize network-oriented attributes, such as network performance, network throughput, network quality of service, and so forth.

Relatively new but nevertheless known in the prior art are methods for routing requests in a content-aware fashion. Such techniques go beyond consideration of just network topology and network related issues (network performance, network reliability, etc.), but also take into consideration the payload being delivered—for example, application level attributes.

Software applications, such as On-Demand Routers (ODRs), act as intermediaries between clients and servers providing the capability to examine individual requests and route each according to polices in observance of metrics. Such software routers offer substantial value for the considered distribution of requests amongst a pool of eligible servers to achieve desirable outcomes such as improved application-level performance, meeting application-level quality of service agreements, enforcing application-level security boundaries, and so forth.

The On-Demand Router is considered a proxy, a specific type of application server, that routes HTTP requests to application servers that then perform the work." The application server is embodied in software. See http://publib.boulder.ibm.com/infocenter/wxddoc51/index.jsp?topic=/com.ibm.wasxd.doc/todoec nfgodr.html.

A non-programmable traffic manager (like its software counterpart ODR) has built in load balancing algorithms upon which routing decisions are made, such as:

Fastest: Passes user connection to available server that responds the fastest;
Round Robin: Sends traffic to the next available server in a predetermined sequence;
Least Connections: Connects the user to the server with the least number of current connections;
Ratio: Performs 'ratios' on the server that best fits the request, according to a system that assigns weights for various factors, such as server capacity.

See: http ://www.f5.com/f5products/products/bigip/ltm/lbl.html. A programmable traffic manager allows decisions to be made based upon (for example) a user defined algorithm. Programming of the router is left as an exercise for the user.

However, such solutions, while beneficial, can be considerably improved upon. Software routers can be expensive to acquire and maintain, are often complex to configure, are not standardized, and are generally slow performers relative to firmware/hardware routers. Additionally, such proprietary software routers make it practically impossible to simultaneously utilize more than one vendor's server and router platforms.

SUMMARY OF THE INVENTION

To significant advantage, the present invention has none of the above limitations. The present invention facilitates employment of programmable traffic management devices to produce outcomes formerly attainable only through proprietary software solutions, such as On-Demand Routers. By doing so, all the advantages of the prior art are realized in addition to several new and desirable features including: improved performance; reduced cost; increased flexibility and interchangeability; application-level middleware directed routing; and application-level feedback for routing adjustability.

The present invention is one way to program a programmable router (implemented in hardware or software) so that applications themselves (or some representative or delegate) control routing by means of application-oriented directives.

The present invention is router indifferent with respect to implementation in software or hardware or firmware or some combination thereof. Any programmable router will suffice. What's important is that the router implementation expose a programmable interface so that incoming requests are routed according to user/application supplied algorithms that consider application-oriented directives.

One aspect of the present invention is to supply traffic management algorithms that consider application-oriented directives. With this invention the back-end clusters feed "executable code" into the router, instead of feeding runtime state information into a pre-defined routing algorithm. This invention provides for injecting the algorithm itself into the router. By having the middleware/application so inject the algorithm, the router can more easily perform application-oriented routing tasks.

The teachings of the present invention will become apparent from the following detailed description of illustrative embodiments thereof, which is to be read in connection with the accompanying drawings.

DETAILED DESCRIPTION

The present invention will be described below using an illustrative example centered on an Internet based client-server model. However, it is to be understood that the present invention is not to be limited as such and is applicable to any request-based environment whereby application-oriented routing capabilities are desirable.

An "application-oriented or application level directive" may be an autonomic reflex that an application produces in response to some stimulus. For example, if an application determines that its quality of service criteria are not being met on node A but are far exceeding requirements on node B, it may produce an "application-oriented directive" to route selected application destined traffic away from node A and toward node B.

Figure 1:
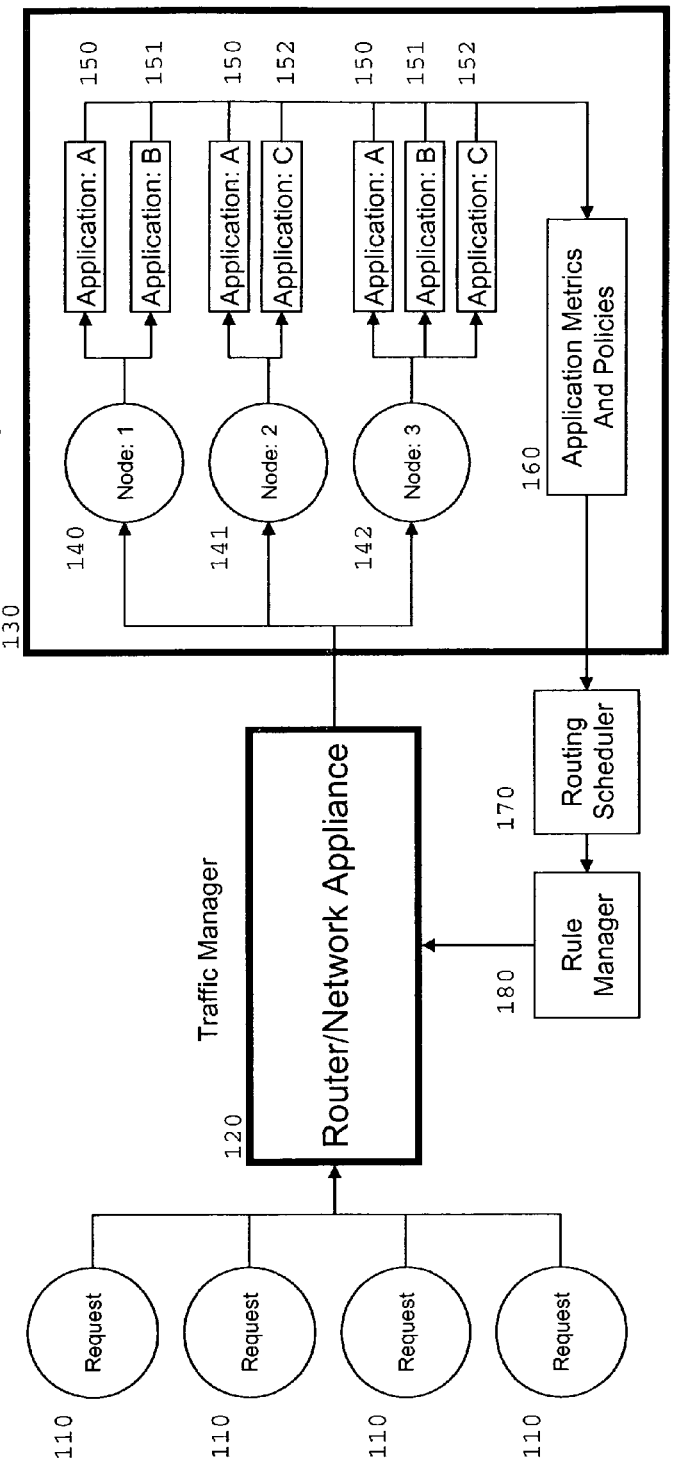
FIG. 1 is a diagram showing a runtime architecture for routing of requests to distributed applications by means of a traffic manager programmed according to an application's desires.

Referring initially to FIG. 1, an architecture is illustrated according to an embodiment of the present invention. A plurality of requests 110 are submitted by clients for processing. Said requests may originate from a diverse set of clients (personal computers, personal digital assistants, cellular telephones, etc.), and may find their way to a data center for processing via a multitude of paths (wireless and/or wired communications, Intranet, Internet, WAN, LAN, etc.). The present invention is not limited to any particular communications network.

A client request 110 may also originate from a node hosting an application server. An application server 150-152 may be comprised of a general purpose server hosting one or more applications. A node 140-142 may host one or more application servers 150-152. A request may or may not result in information returned to the requester. The present invention places no requirements on the type of a request or the type of node 140-142 or application server 150-152 that processes a request, though for purposes of clarity an example below describes one manner in which the present invention can be applied for routing of client initiated HTTP requests to applications on servers that handle such requests.

At some boundary, subsequent to any outlying routing, a client request 110 arrives at a Traffic Manager 120. The Traffic Manager 120 is responsible for routing each arriving request to one of a plurality of application instances 150 -152 deployed on corresponding nodes 140-142 within a cluster 130. According to an embodiment of the present invention, the Traffic Manager 120 routes each client request 110 to the desired application instance 150-152 by consulting programmed rules. Programmed rules are executable polices (directives) specifiable by applications themselves and/or by other suitable providers.

It is to be understood that the present invention is not to be limited to any particular configuration, such as that illustrated by FIG. 1, which is provided for illustrative purposes. For example, a plurality of Traffic Managers 120 or a plurality of clusters 130 may be may be utilized. One skilled in the related art can easily contemplate these and other suitable configurations.

The programmable Traffic Manager 120 is endowed with several capabilities. Through a published Application Program Interface (API), it is able to receive and store rules that govern how it should route requests. In addition, during processing of requests the Traffic Manager 120 is able to fetch, interpret, and apply these rules that instruct the Traffic Manager 120 on the specific content of arriving requests to examine for use in determination of where to route each request. Based upon the programmed rules and the content of each request, the Traffic Manager 120 routes each request accordingly.

Without programmed rules, the Traffic Manager 120 has no intelligence. That is, the Traffic Manager 120 does not know how to examine or route requests until it is provided one or more rules that direct its behavior. Unlike the prior art, whereby routing at the TCP/IP Network and Transport layers failed to consider application-level routing, the present invention facilitates programmed rules for directing network traffic in correspondence with the needs and desires of the target application. That is, the present invention provides application-level (or application-oriented) routing through rules-based programming of the traffic manager.

For example, initially Application A may desire that requests to trade IBM stock be directed to the Application A instance on Node 1. Later, Application A may provide new rules so that newly arriving requests to trade IBM stock be directed to the Application A instance on Node 2. The "needs and desires of the target application" are embodied in the currently active application provided set of algorithms (or "rules"). The application provided algorithms can be as simple or as complex as the programmable router is capable of accepting though its API. The application provided algorithms can examine the content of requests (for consideration in where the request should be routed) arriving at the programmable router to the degree permitted by the it. The application itself does not have to directly provide the algorithms—instead a proxy or representative may do so.

The application-level rules programmed into the Traffic Manager 120 may be static or dynamic in nature. The application-level programmed rules may be set once then remain unchanged for long periods of time, or they may change frequently. Control of routing changes may come directly from an application, or from an application monitor, or from an application analyzer, or from an application proxy and/or other entity. It is to be understood that the present invention is not to be limited to any particular application-level routing control authority.

As a specific example that will be used throughout, suppose that the target application is a stock quote server, and that a client is one that is able to request stock quotes based on user entered ticker symbol. A client may issue an HTTP request 110 to obtain a stock quote for ticker symbol IBM. Further, suppose that any of the Application A instances 150 can satisfy the IBM stock quote request. Under some circumstances, it may be desirable to "round robin" each client initiated IBM stock quote request 110 amongst the plurality of Application A instances 150 able to service them. But under other circumstances, it may be desirable to route all such requests 110 to exactly one Application A instance, say the one running on Node 1 (140).

The Programmable Traffic Manager 120 is able to interrogate each request to obtain one or more attributes, for example stock ticker symbol associated with a request, and apply the programmed rules accordingly to determine destination node. Programmed rules may be changed dynamically to effect revised routing decisions, for example re-routing requests previously destined for Node 1 (140) to Node 2 (141).

In one embodiment of the present invention for partitioning of requests 110 amongst application instances 150-152, facilities are provided for applications to indicate desired routing by means of one or more Regular Expressions (REs), which are well known in the related art. The application may, for example, specify a RE such that all requests for stock ticker symbol IBM are routed to application instance A (150) running on Node 1 (140). Application-oriented routing information, be it static or dynamic, one or multi-dimensional, is specifiable through Extensible Mark-up Language (XML) data and/or API calls. These data comprise the Metrics and Policies 160.

The present invention places no restriction on the types of static and dynamic application-oriented data that can be considered for Metrics and Policies 160. Such data need not be restricted to applications, per se. Metrics may include disk space available, CPU utilization, memory utilization, priority, and myriad other dimensions at the application level, system level, or at some other abstraction level. Policies may be specified as REs or in any other suitable form. Policies may target one or more applications. An individual Policy may span multiple applications.

One important aspect of the present invention is the ability to deploy suitably formed executable policies into the router (Traffic Manager 120). This novel aspect greatly improves upon the state of the art, for example where a framework simply updates state variables for some well know policy. Since the deployed artifacts are in fact executable, the present invention provides for significantly advanced flexibility and expression in runtime routing decision making.

The Routing Scheduler 170 provides a means for Application Policies and Metrics 160 to be deployed to one or more Traffic Managers 120, after having been transformed into a suitable form by a Rule Manager 180.

The Routing Scheduler 170 may receive application-oriented feedback over time that effects routing. Continuing the above example, suppose that originally stock ticker symbols have been partitioned so that IBM stock quote requests 110 are directed by one or more Traffic Managers 120 to Application A 150 on Node 1 (140) for service. At some point the application decides to move the IBM partition to Node 2 (141), perhaps attempting to achieve improved response time. This revised Application Metric and Policy 160 information is provided to the Routing Scheduler 170, which, in turn, employs the Rule Manager 180 to transform and deploy correspondingly updated rules to one or more Traffic Managers 120. Subsequently, IBM stock quote requests 110 arriving at said re-programmed Traffic Managers 120 are directed to Node 2 (141) for service.

In one specific implementation, an F5 BIG-IP Application Management Traffic Device was used as the Traffic Manager 120. A single Metric 160 comprised of a string indicating partition name IBM, and a single Policy 160 to extract stock ticker symbol from each request 110 were employed. A Routing Scheduler 170 employed a Rule Manager 180 to formulate programmed rules deployed to the Traffic Manager 120 so that requests for stock quotes for ticker symbol IBM were routed to Node 1 (140).

It is to be understood that the present invention is not to be limited to any particular traffic manager implementation. It is to be further understood that the present invention is not to be limited by use of programmed rules for controlling traffic manager behavior. One skilled in the art can readily employ other suitable variability mechanisms such as databases or ontologies to replace or supplement programmed rules.

The present invention distinguishes itself from both quality of service network routing and TCP/IP distributed application network routing though its application-oriented routing capabilities. Neither of these previously existing techniques offer the types of controls necessary for precision application directed routing.

Figure 2:
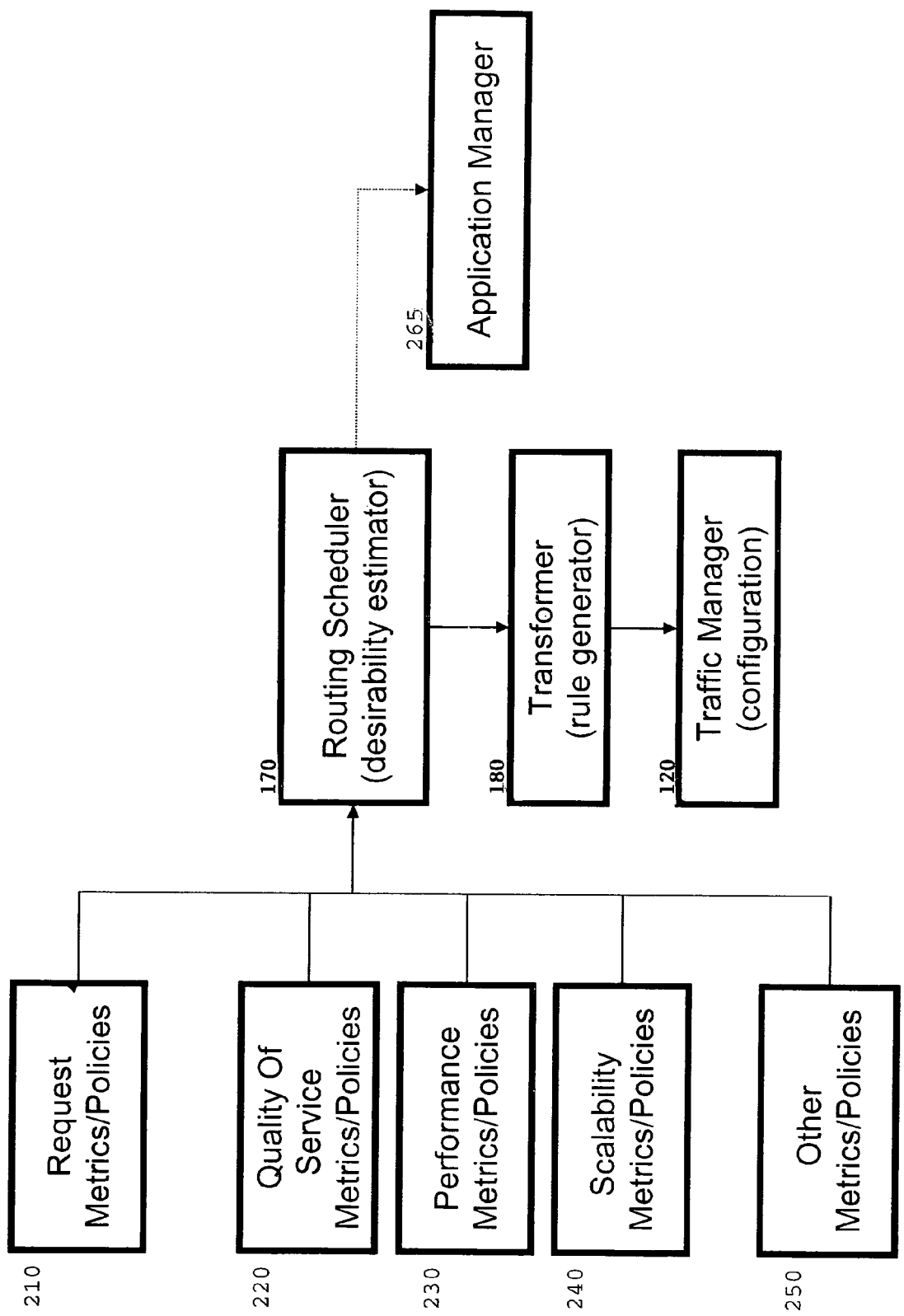
FIG. 2 is a diagram showing a method for programming a traffic manager.

Referring now to FIG. 2, a method for programming a traffic manager is illustrated. A plurality of metrics and policies 210-250 from one or more application-oriented sources in one or more formats are delivered to a Routing Scheduler 170. Such sources may include, for example, XML data attached to the application that specify application policies and XML data attached to the system that describe system attributes. This application-oriented information may be pushed to or pulled by the Routing Scheduler. The application-oriented metrics and policies information may be assembled once per deployment or may be ongoing. The Routing Scheduler compiles the application-oriented metrics and polices to arrive at an estimated application-oriented desired routing. In the case of ongoing dynamically adjustable routing, as more information arrives it is compiled to produce new application-oriented desired routing estimates.

Application-oriented metrics and policies comprise application-oriented directives. Such directives may include application-level metrics and policies, for example definitions for stock ticker symbols such as "IBM", "GE", and "EBAY" and corresponding desired trade response times; system-level metrics and policies, for example application CPU consumption limits at each node; and enterprise-level metrics and policies, for example the relative shares of memory allocated to each application enterprise-wide.

An application oriented metric may be a metric of interest or use to an application more so than the system upon which the application runs. For example, a stock ticker symbol may be of use to one application but would likely not be of interest or use the system and other applications. A non-application-oriented metric may be a system metric, such as CPU utilization.

An application oriented routing policy is a routing policy influenced or directed by an application, not just by the system. For example, a system load balancing policy may route each newly arriving request to the node with the lowest CPU utilization, regardless of the needs and desires of the application running on those nodes. Whereas, an application-oriented routing policy may route requests for IBM stock trades to Node 1 and requests for GE stock trades to Node 2.

In the former case, the application may not be able to use aggressive caching techniques, since each request to trade IBM stock may be sent to a different node. In the latter case, the application might employ aggressive caching techniques with the knowledge that all requests to trade IBM stock will arrive at Node 1.

Below is an XML representation of application-oriented policies that route user requests for stock trades. Request for IBM stock trades would be routed to Node 1, while request for GE stock trades would be routed to Node 2, etc.

```
<Policy    StockTicker=IBM     Node=1    />
<Policy    StockTicker=GE      Node=2    />
<Policy    StockTicker=EBAY    Node=3    />
<Policy    StockTicker=GOOG    Node=3    />
```

Another example of a policy, in this case a dynamic policy, for routing user requests to trade IBM stock is shown below in XML format In this case, the router will attempt to route only to nodes where the response time is less than 0.5 sec.

```
<Policy StockTicker=IBM ResponseTime<0.5 sec/>
```

The Routing Scheduler 170 may be implemented as a Java program that analyzes application provided metrics and policies to produce one or more strategies for routing of requests. For example, the analyzer may determine that a very large number of requests to trade IBM and eBay stocks are arriving, while a relatively small number of requests to trade GE and McDonalds also arriving. Further, the application may have a high priority policy of minimized queue delay. The analyzer may determine that the best strategy is to route requests for IBM and GE stock trading to Application A on Node 1, and requests for eBay and Google stock trading to Application A on Node 2.

The Rule Manager 180 may be implemented as a Java program that transforms strategies produced by the Routing Scheduler 170 into a form executable by a programmable router (i.e.—Traffic Manager 120) according to its API. For example, in one implementation the Routing Scheduler 170 produces one or more Regular Expressions (REs), well known in the related art, as the representation of routing rules to be carried out by the router. The Rule Manager 180 takes said one or more REs and does a transformation (if necessary) into a form recognized by the Traffic Manager 120, then invokes the corresponding Traffic Manager 120 API to add and/or modify and/or remove the routing rules executed by it at runtime for routing of arriving application service requests.

In one embodiment, the Routing Scheduler 170 is a Java program that simply takes application policies specified as REs in XML format and passes them onto the Rule Manager 180 as is. In another embodiment, a Java program retrieves application policies specified in an application specific format thorough an application specified API, then employs one or more plugin components to transform the representation of policies and metrics into a common form, such as REs prior to passing them onto the Rule Manager 180.

Once an application-oriented desirable estimate has been achieved, the Routing Scheduler 170 employs a Transformer 180 to produce deployable rules. The Routing Scheduler may also deliver, via subscription or on-demand request, the application-oriented desired routing estimate to other interested parties, such as an Application Manager 265, directly or though some intermediary. Once transformed, the rules can be deployed to configure a Traffic Manager 120.

An "application oriented desired routing estimate" is the routing desired by the application, which may not be doable in reality. For example, an "estimate" may be to route requests for IBM stock trades to Node 1, and requests for GE stock trades to Node 2. However, when a request arrives, Node 1 may have since gone down. In that case, the request may be routed to another node for service, not the application desired one.

The Traffic Manager 120 expects the routing specification in a certain format in order to be programmed according to its API; and the application may specify is policies in a format that does not precisely match the format understood by the Traffic Manager; and thus the Rule Manager 180 does a transformation between these formats. Then the Traffic Manager 120 receives and implements the application-oriented routing specifications deployed by the Rule Manager.

For example, one particular format specifiable by applications is Regular Expressions in XML, which are transformed into a format suitable for use by F5's Traffic Manager and are deployed by invoking the Traffic Manager's API to load the transformed REs.

Figure 3:
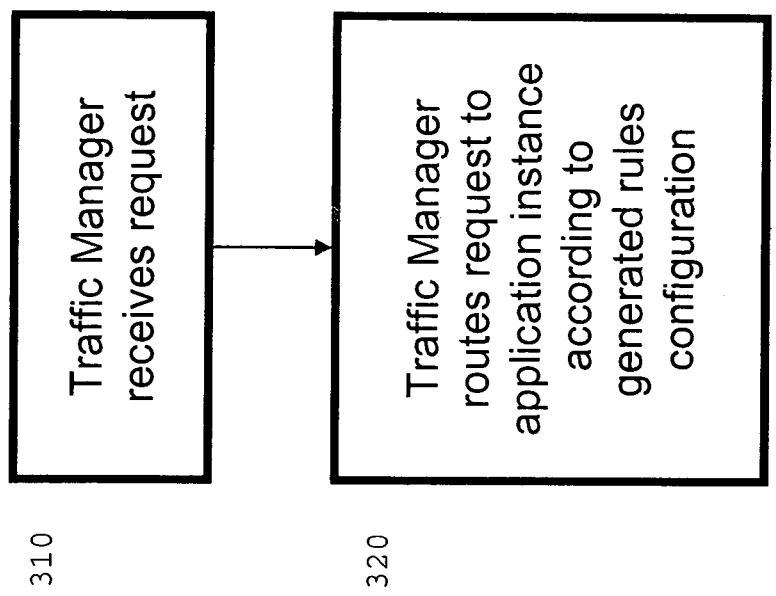
FIG. 3 is a diagram showing a method for traffic manager request routing according to externally applied configuration criteria.

Referring now to FIG. 3, a method for traffic manager request routing according to externally applied configuration criteria is illustrated. A traffic manager receives a request (310) and routes it to the appropriate application instance in correspondence with a generated rules configuration (320) produced by the Rule Manager 180.

Externally applied configuration criteria may include algorithms (or "rules") that control how the routing of requests is to occur, are constructed outside of the router proper, and then fed into the router by means of the router's API.

The output of the Rule Manager 180 is delivered to the Traffic Manager 120 according to the latter's API. The Traffic Manager then utilizes the additions/changes/deletions so delivered for all applicable routing of requests from that point forward.

While the foregoing is directed to the illustrative embodiment of the present invention, other and further embodiments of the invention may be devised without departing from the basic scope thereof.

What is claimed is:

1. In a communications network having a plurality of nodes, a method of routing data through said network, said method comprising:
   programming a programmable traffic manager using at least one application level directive; and
   routing said data through said network using said programmable traffic manager, wherein said data is routed in accordance with said application level directive, and wherein said programmable traffic manager causes said data to be routed to one of said nodes, said programmable traffic manager programmed dynamically by at least a target application,
   wherein said target application dynamically programs said traffic manager to route said target application destined data traffic toward a second node, responsive to said target application determining that one or more of its quality of service criteria is not being met on a first node,
   a transformer transforming one or more routing strategies into a form executable by said programmable traffic manager.

2. A method as recited in claim 1, wherein said nodes are servers hosting an application and said data is a request from a client.

3. A method as recited in claim 1, wherein said application level directive is established by at least one of the following: an application, an application monitor, an application proxy, and an application analyzer.

4. A method as recited in claim 1, wherein said application level directive uses at least one of the following: application-level metrics, system-level metrics, and enterprise-level metrics.

5. A method as recited in claim 1, wherein said application level directive comprises at least one of the following: application-level policies, system-level policies, and enterprise-level policies.

6. A method as recited in claim 1, wherein said application level directive interrogates said data for at least one attribute to determine said one node to which said data is to be routed.

7. A method as recited in claim 1, wherein said programmable traffic manager is dynamically re-programmed through an application program interface for dynamic re-configuration of said application level directive.

8. A method as recited in claim 7, wherein said reprogramming results in a routing destination change for said data.

9. A method as recited in claim 1, wherein at least one application level directive comprises policies and metrics specified as at least one regular expression.

10. An application-oriented routing method for routing requests to a plurality of servers using a programmable traffic manager, said method comprising the steps of:
  employing at least one application level metric and at least one application-oriented policy to estimate at least one request route;
  transforming said estimated route into a form suitable for said programmable traffic manager;
  deploying said transformed estimated route onto said programmable traffic manager; and
  routing at least one request according to said deployed estimate route through said programmable traffic manager, said programmable traffic manager programmed dynamically by at least a target application,
  wherein said target application dynamically programs said traffic manager to route said target application destined data traffic toward a second node, responsive to said target application determining that one or more of its quality of service criteria is not being met on a first node,
  a transformer transforming one or more route strategies into a form executable by said programmable traffic manager.

11. A program storage device readable by a digital processing apparatus and having a program of instructions which are tangibly embodied on the storage device and which are executable by the processing apparatus to perform a method of routing data through a communications network, said method comprising:
  programming a programmable traffic manager using at least one application level directive, said programmable traffic manager programmed dynamically by at least a target application,
  wherein said target application dynamically programs said traffic manager to route said target application destined data traffic toward a second node, responsive to said target application determining that one or more of its quality of service criteria is not being met on a first node,
  said target application injecting executable code into said programmable traffic manager; and
  routing said data through said network using said programmable traffic manager, wherein said data is routed in accordance with said application level directive, and wherein said programmable traffic manager causes said data to be routed to one of said nodes.

12. An apparatus for routing data over in a communications network having a plurality of nodes, said apparatus comprising:
  a programmable traffic manager; and
  a processor for programming said traffic manager with at least one application level directive, wherein said programmed traffic manager causes said data to be routed to one of said nodes,
  said programmable traffic manager programmed dynamically by at least a target application;
  wherein said target application dynamically programs said traffic manager to route said target application destined data traffic toward a second node, responsive to said target application determining that one or more of its quality of service criteria is not being met on a first node,
  a transformer transforming one or more routing strategies into a form executable by said programmable traffic manager.

\* \* \* \* \*